(12) United States Patent
Ohta et al.

(10) Patent No.: US 11,018,809 B2
(45) Date of Patent: May 25, 2021

(54) COMMUNICATION APPARATUS, WIRELESS COMMUNICATION SYSTEM, AND WIRELESS COMMUNICATION METHOD

(71) Applicant: FUJITSU LIMITED, Kawasaki (JP)

(72) Inventors: Yoshiaki Ohta, Yokohama (JP); Yoshihiro Kawasaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/166,757

(22) Filed: Oct. 22, 2018

(65) Prior Publication Data

US 2019/0074933 A1 Mar. 7, 2019

Related U.S. Application Data

(63) Continuation of application No. PCT/JP2016/064368, filed on May 13, 2016.

(51) Int. Cl.
*H04L 1/18* (2006.01)
*H04W 28/04* (2009.01)

(52) U.S. Cl.
CPC ............ *H04L 1/1809* (2013.01); *H04L 1/189* (2013.01); *H04L 1/1816* (2013.01); *H04L 1/1825* (2013.01); *H04L 1/1877* (2013.01); *H04L 1/1887* (2013.01); *H04L 1/1896* (2013.01); *H04W 28/04* (2013.01)

(58) Field of Classification Search
None
See application file for complete search history.

(56) References Cited

U.S. PATENT DOCUMENTS

| 2003/0126238 | A1 | 7/2003 | Kohno et al. |
| 2004/0199814 | A1* | 10/2004 | Kim ............ H04L 1/0061 714/18 |
| 2005/0050424 | A1 | 3/2005 | Matsuura |
| 2008/0130617 | A1* | 6/2008 | Singh ........... H04L 1/1671 370/345 |
| 2008/0184087 | A1 | 7/2008 | Hayashi |

(Continued)

FOREIGN PATENT DOCUMENTS

| EP | 3 084 997 A1 | 10/2016 |
| JP | 2003-179580 A | 6/2003 |

(Continued)

OTHER PUBLICATIONS

Extended European search report with supplementary European search report, Annex to the European search report, and the European search opinion issued by the European Patent Office for corresponding European Patent Applicatio No. 16901714.2, dated Mar. 21, 2019.

(Continued)

*Primary Examiner* — Kodzovi Acolatse
(74) *Attorney, Agent, or Firm* — Myers Wolin, LLC

(57) ABSTRACT

A communication apparatus includes a radio processing unit configured to transmit or receive a radio signal; and a control unit configured to control application of retransmission control in accordance with information indicating whether or not to apply the retransmission control, the information being included in a radio signal received from another communication apparatus via the radio processing unit.

6 Claims, 11 Drawing Sheets

(56) References Cited

U.S. PATENT DOCUMENTS

| | | | | |
|---|---|---|---|---|
| 2009/0257357 A1* | 10/2009 | Marsh | ................... | H04L 1/0003 370/252 |
| 2009/0258665 A1* | 10/2009 | Bourlas | ................. | H04L 1/0003 455/522 |
| 2016/0094327 A1* | 3/2016 | Han | ...................... | H04L 1/0073 370/329 |
| 2017/0048026 A1* | 2/2017 | Park | ...................... | H04L 1/1812 |
| 2017/0238301 A1 | 8/2017 | Nakazawa et al. | | |

FOREIGN PATENT DOCUMENTS

| | | |
|---|---|---|
| JP | 2005-45409 A | 2/2005 |
| JP | 2008-182648 A | 8/2008 |
| WO | 2015/094069 A1 | 6/2015 |
| WO | 2016/068072 A1 | 5/2016 |

OTHER PUBLICATIONS

3GPP TS 36.300 V13.3.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", Mar. 2016.
3GPP TS 36.211 V13.1.0, "3rd Generation Partnership Project; Technical Specification Group Radio Access Network; Evolved Universal Terrestrial Radio Access (E-UTRA); Physical channels and modulation (Release 13)", Mar. 2016.
3GPP TS 36.212 V13.1.0, "3rd Generation Partnership Project; Technical Specification Group Radio Access Network; Evolved Universal Terrestrial Radio Access (E-UTRA); Multiplexing and channel coding (Release 13)", Mar. 2016.
3GPP TS 36.213 V13.1.1, "3rd Generation Partnership Project; Technical Specification Group Radio Access Network; Evolved Universal Terrestrial Radio Access (E-UTRA); Physical layer procedures (Release 13)", Mar. 2016.
3GPP TS 36.321 V13.1.0, "3rd Generation Partnership Project; Technical Specification Group Radio Access Network; Evolved Universal Terrestrial Radio Access (E-UTRA); Medium Access Control (MAC) protocol specification (Release 13)", Mar. 2016.
3GPP TS 36.322 V13.1.0, "3rd Generation Partnership Project; Technical Specification Group Radio Access Network; Evolved Universal Terrestrial Radio Access (E-UTRA); Radio Link Control (RLC) protocol specification (Release 13)", Mar. 2016.
3GPP TS 36.323 V13.1.0, "3rd Generation Partnership Project; Technical Specification Group Radio Access Network; Evolved Universal Terrestrial Radio Access (E-UTRA); Packet Data Convergence Protocol (PDCP) specification (Release 13)", Mar. 2016.
3GPP TS 36.331 V13.1.0, "3rd Generation Partnership Project; Technical Specification Group Radio Access Network; Evolved Universal Terrestrial Radio Access (E-UTRA); Radio Resource Control (RRC); Protocol specification (Release 13)", Mar. 2016.
3GPP TS 36.413 V13.2.0, "3rd Generation Partnership Project; Technical Specification Group Radio Access Network; Evolved Universal Terrestrial Radio Access Network (E-UTRAN); S1 Application Protocol (S1AP) (Release 13)", Mar. 2016.
3GPP TS 36.423 V13.3.0, "3rd Generation Partnership Project; Technical Specification Group Radio Access Network; Evolved Universal Terrestrial Radio Access Network (E-UTRAN); X2 application protocol (X2AP) (Release 13)", Mar. 2016.
3GPP TR 36.881 V0.6.0, "3rd Generation Partnership Project; Technical Specification Group Radio Access Network; Evolved Universal Terrestrial Radio Access (E-UTRA); Study on latency reduction techniques for LTE (Release 13)", Feb. 2016.
International Search Report issued by the Japan Patent Office for corresponding International Patent Application No. PCT/JP2016/064368, dated Jul. 19, 2016, with an English translation.
Written Opinion of the International Searching Authority issued by the Japan Patent Office for corresponding International Patent Application No. PCT/JP2016/064368, dated Jul. 19, 2016, with an English translation.
Notice of Reasons for Refusal issued by the Japan Patent Office for corresponding Japanese Patent Application No. 2018-516325, dated Jun. 4, 2019, with an English translation.
Decision of Refusal issued by the Japan Patent Office for corresponding Japanese Patent Application No. 2018-516325, dated Feb. 4, 2020, with an English translation.
Communication pursuant to Article 94(3) EPC issued by the European Patent Office for corresponding European Patent Application No. 16 901 714.2-1205, dated Mar. 23, 2021.

* cited by examiner

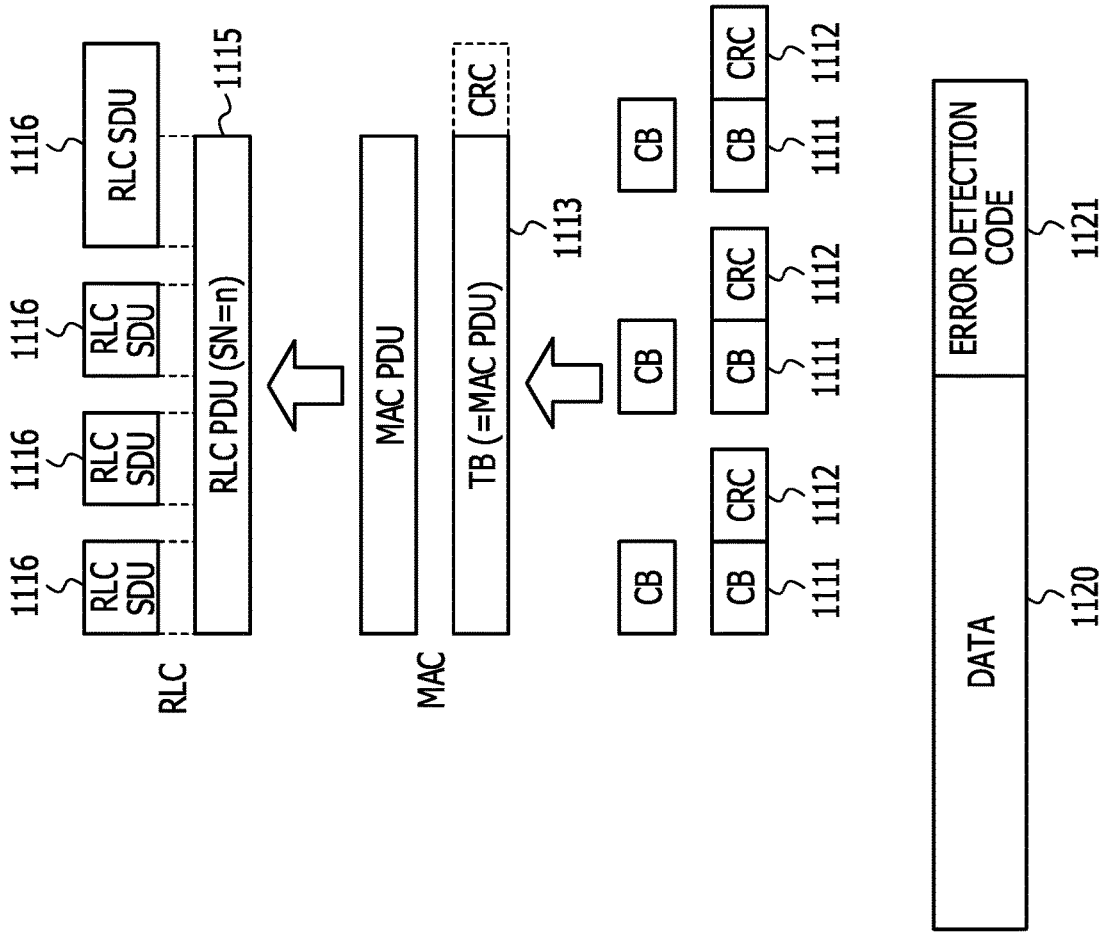
FIG. 11B
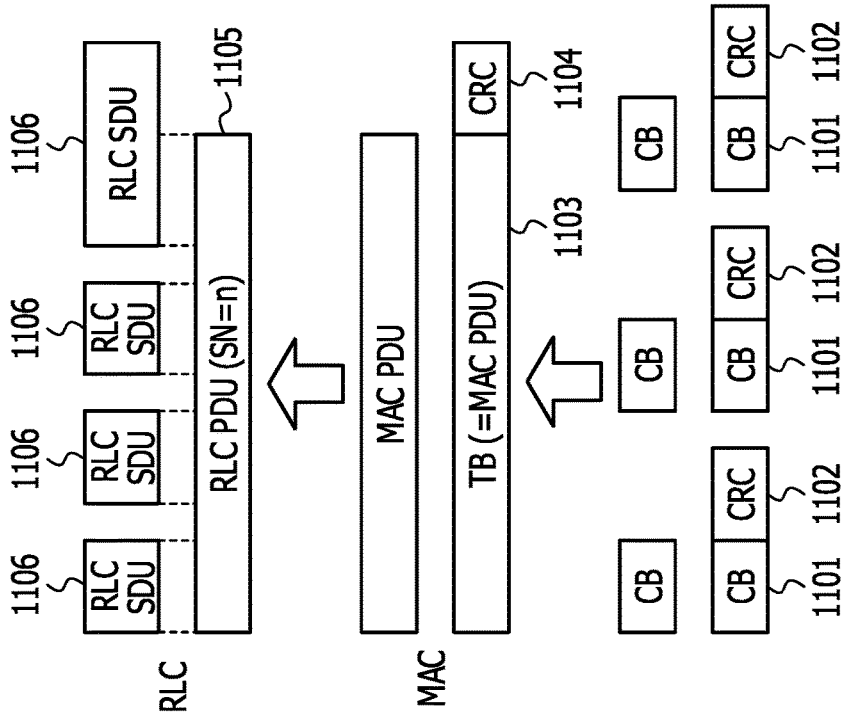
FIG. 11A
FIG. 11C

COMMUNICATION APPARATUS, WIRELESS COMMUNICATION SYSTEM, AND WIRELESS COMMUNICATION METHOD

CROSS-REFERENCE TO RELATED APPLICATION(S)

This application is a continuation application of International Application PCT/JP2016/064368 filed on May 13, 2016 and designated the U.S., the entire contents of which are incorporated herein by reference.

FIELD

The present invention relates to, for example, a communication apparatus, a wireless communication system, and a wireless communication method that are for performing wireless communication.

BACKGROUND

In wireless communication systems such as mobile communication systems, the amount of data transmitted and received in the wireless communication systems has been increasing due to an increase in the number of communication terminals connected to each other, higher quality of transmitted data, diversification of provided services, or the like. Accordingly, to increase the communication capacity of the wireless communication systems, various techniques have been developed and standardized as standards for the wireless communication systems.

Examples of the related art include [NPL 1: 3GPP TS36.300 v13.3.0, March 2016], [NPL 2: 3GPP TS36.211 v13.1.0, March 2016], [NPL 3: 3GPP TS36.212 v13.1.0, March 2016], [NPL 4: 3GPP TS36.213 v13.1.1, March 2016], [NPL 5: 3GPP TS36.321 v13.1.0, March 2016], [NPL 6: 3GPP TS36.322 v13.1.0, March 2016], [NPL 7: 3GPP TS36.323 v13.1.0, March 2016], [NPL 8: 3GPP TS36.331 v13.1.0, March 2016], [NPL 9: 3GPP TS36.413 v13.2.0, March 2016], [NPL 10: 3GPP TS36.423 v13.3.0, March 2016], [NPL 11: 3GPP TS36.881 v0.6.0, February 2016].

SUMMARY

According to one embodiment, a communication apparatus is provided. The communication apparatus includes a radio processing unit configured to transmit or receive a radio signal; and a control unit configured to control application of retransmission control in accordance with information indicating whether or not to apply the retransmission control, the information being included in a radio signal received from another communication apparatus via the radio processing unit.

According to another embodiment, a wireless communication system including a first communication apparatus and a second communication apparatus is provided. In the wireless communication system, the first communication apparatus is configured to transmit a radio signal to the second communication apparatus, the radio signal including information indicating whether or not to apply retransmission control, and the second communication apparatus is configured to control application of the retransmission control in accordance with the information.

According to still another embodiment, a wireless communication method in a wireless communication system including a first communication apparatus and a second communication apparatus is provided. The wireless communication method includes transmitting, with the first communication apparatus, a radio signal to the second communication apparatus, the radio signal including information indicating whether or not to apply retransmission control; and controlling, with the second communication apparatus, application of the retransmission control in accordance with the information.

According to still another embodiment, a communication apparatus is provided. The communication apparatus includes a radio processing unit configured to transmit or receive a radio signal; and a control unit configured to determine whether or not to apply retransmission control, based on at least any of a communication state of wireless communication with another communication apparatus, a communication amount of the wireless communication, and a type of data transmitted between the communication apparatus and the other communication apparatus, to generate, based on a result of the determination, a radio signal including information indicating whether or not to apply the retransmission control, and to transmit the radio signal to the other communication apparatus via the radio processing unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 11A is a diagram illustrating an example of the structure of data transmitted by an uplink signal when retransmission control is applied, FIG. 11B is a diagram illustrating an example of the structure of data transmitted by an uplink signal when retransmission control is not applied, and FIG. 11C is a diagram illustrating another example of the structure of data transmitted by an uplink signal.

DESCRIPTION OF EMBODIMENTS

Figure 1:
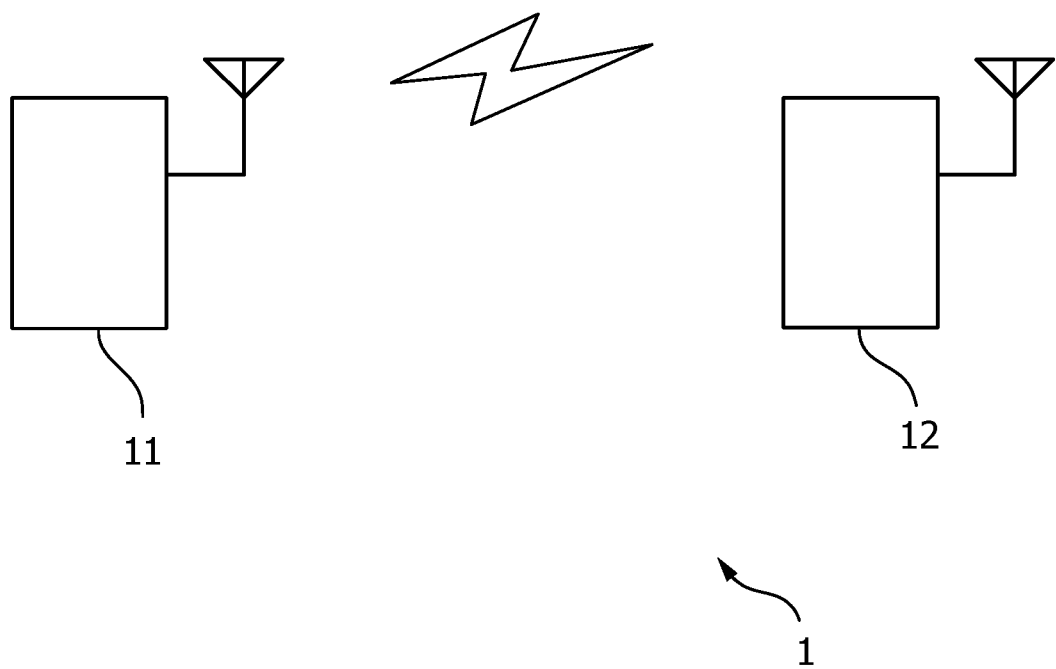
FIG. 1 is a schematic configuration diagram of a wireless communication system according to a first embodiment.

However, there is a possibility that the amount of data transmitted in wireless communication systems will increase more and more. Accordingly, increasing of communication efficiency of the wireless communications systems is demanded.

In one aspect, an object of the present invention is to provide a communication apparatus that is capable of increasing communication efficiency of a wireless communication network.

Hereinafter, a description will be given of a communication apparatus, a wireless communication system, and a communication method with reference to the drawings.

In so-called Long Term Evolution (LTE), Worldwide Interoperability for Microwave Access (WiMAX), or the like, which is one of standards for mobile communications, Hybrid Automatic Repeat reQuest (HARQ) has been adopted. HARQ is one of techniques related to retransmission control in which a transmission-side communication apparatus retransmits data when a reception-side communication apparatus fails to correctly receive the data, and is a combination of Forward Error Correction (FEC) code and Automatic Repeat reQuest (ARQ). In HARQ, a reception-side communication apparatus, such as a base station, transmits an ACK (Acknowledge) signal or a NACK (Negative Acknowledge) signal to a transmission-side communication apparatus, such as a mobile station, to notify the transmission-side communication apparatus whether or not data received from the transmission-side communication apparatus has. The transmission-side communication apparatus that has received the NACK signal divides the data into portions and retransmits the data portion by portion. Accordingly, the reception-side communication apparatus that has once failed to the data becomes able to normally reproduce the data.

However, depending on the type of data, there is traffic in which tolerance for delay is low although a certain transmission error is allowed (Low Latency Communication Traffic (LLC Traffic)). Regarding LLC Traffic, suppression of delay may take priority over suppression of transmission error. In this case, retransmission control is not necessarily performed.

In addition, Contention-Based Physical Uplink Shared CHannel (CB-PUSCH) has been under consideration regarding the uplink. Also, transmitting of LLC Traffic data using CB-PUSCH has been under consideration. When HARQ is applied in such a case, an ACK signal or a NACK signal is transmitted although retransmission control is not to be performed, and thus communication efficiency in wireless communication is decreased.

According to the present embodiment, one of communication apparatuses determines, based on at least any of a communication state, a communication amount, and the type of data that is transmitted, for example, whether or not to apply retransmission control, and notifies the other communication apparatus whether or not to apply retransmission control. In accordance with the notification, the other communication apparatus controls application of retransmission control. The other communication apparatus adds an error detection code related to retransmission control to a signal that is to be transmitted when applying retransmission control, and does not add the error detection code to the signal that is to be transmitted when not applying retransmission control. Accordingly, the communication apparatuses and a wireless communication system including the communication apparatuses increase communication efficiency.

In this specification, each of a base station and a mobile station is an example of a communication apparatus. Node B, eNode B, new eNode B, an access point, or the like is an example of a base station. Furthermore, a mobile terminal or user equipment (UE) is an example of a mobile station. In this specification, HARQ, ARQ, or the like is an example of retransmission control. An error detection code related to retransmission control is an error detection code that is used by a reception-side communication apparatus to determine whether or not to issue a retransmission request in accordance with whether or not received data is normally reproduced. It is assumed that the error detection code includes an error correction code.

FIG. 1 is a schematic configuration diagram of a wireless communication system according to a first embodiment. A wireless communication system 1 includes a communication apparatus 11 and a communication apparatus 12. The communication apparatus 11 and the communication apparatus 12 transmit a signal to each other through wireless communication. Either or both of the communication apparatus 11 and the communication apparatus 12 may be a mobile terminal or may be a fixed communication apparatus.

The communication apparatus 11 determines, at a regular interval or at predetermined timing, whether or not to apply retransmission control, in accordance with a communication state or a communication amount of wireless communication between the communication apparatus 11 and the communication apparatus 12, or the type of data transmitted between the communication apparatus 11 and the communication apparatus 12.

Every time the communication apparatus 11 determines whether or not to apply retransmission control, the communication apparatus 11 generates a control signal including information indicating whether or not to apply retransmission control and transmits the control signal to the communication apparatus 12. In addition, the communication apparatus 11 controls application of retransmission control in accordance with a determination result of whether or not to apply retransmission control in the wireless communication with the communication apparatus 12. That is, when retransmission control is not applied, the communication apparatus 11 does not transmit a response signal such as ACK or NACK to the communication apparatus 12 regardless of whether or not data included in a radio signal received from the communication apparatus 12 is normally reproduced.

On the other hand, when retransmission control is applied, the communication apparatus 11 executes, on a radio signal, an error detection process corresponding to an error detection code added to the radio signal in accordance with application of retransmission control, thereby determining whether or not the data included in the radio signal is. Subsequently, the communication apparatus 11 transmits a response signal to the communication apparatus 12, the response signal varying in accordance with, for example, whether or not the data included in the radio signal received from the communication apparatus 12 has. For example, when the data included in the radio signal received from the communication apparatus 12 is, the communication apparatus 11 transmits an ACK signal to the communication apparatus 12. On the other hand, when the data included in the radio signal received from the communication apparatus 12 is not, the communication apparatus 11 transmits a NACK signal to the communication apparatus 12. As the error detection code, a Cyclic Redundancy Check (CRC) code is used, for example.

On the other hand, every time the communication apparatus 12 receives a control signal including information indicating whether or not to apply retransmission control from the communication apparatus 11, the communication apparatus 12 controls application of retransmission control by referring to the information. That is, when the received control signal includes information indicating that retransmission control is not applied, the communication apparatus 12 does not apply retransmission control. In this case, the communication apparatus 12 does not add an error detection code related to retransmission control to the radio signal to be transmitted to the communication apparatus 11. In addition, in this case, the communication apparatus 12 is not requested to store, for the purpose of retransmission, data included in the radio signal transmitted to the communication apparatus 11 in a storage unit of the communication apparatus 12, and thus the communication apparatus 12 may discard the data included in the radio signal after transmitting the radio signal.

On the other hand, when the received control signal includes information indicating that retransmission control is applied, the communication apparatus 12 applies retransmission control. In this case, the communication apparatus 12 adds an error detection code related to retransmission control to the radio signal to be transmitted to the communication apparatus 11. In addition, the communication apparatus 12 causes the data included in the radio signal transmitted to the communication apparatus 11 to be kept stored in the storage unit of the communication apparatus 12 until it is determined that the transmitted data has in the communication apparatus 11 or until a certain period elapses, so that the data may be retransmitted. When the communication apparatus 12 receives a signal requesting retransmission (for example, a NACK signal) from the communication apparatus 11, the communication apparatus 12 retransmits a radio signal including part or whole of the data in accordance with the signal.

Figure 2:
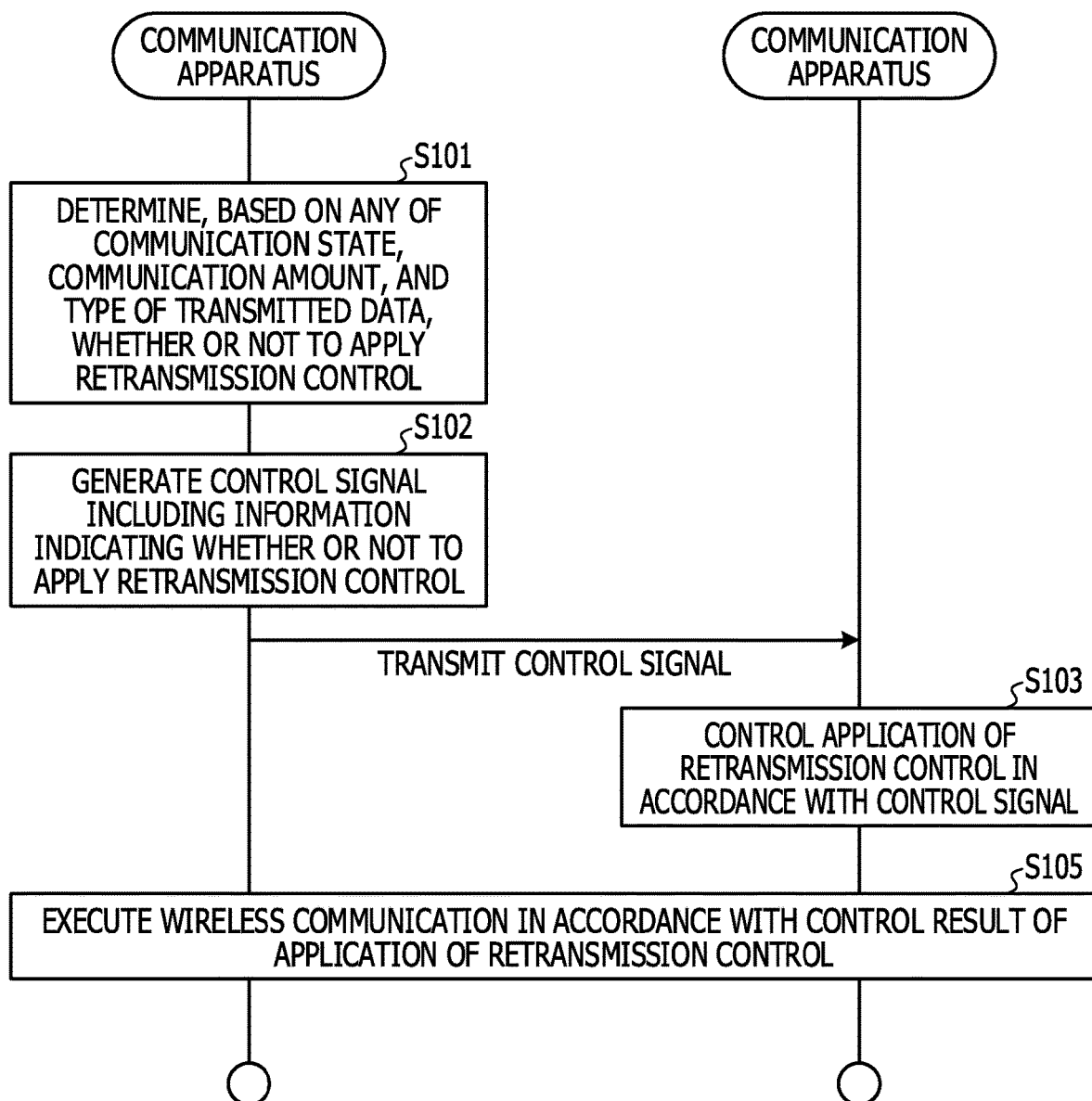
FIG. 2 is an operation sequence diagram of a communication process related to retransmission control.

FIG. 2 is an operation sequence diagram of a communication process related to retransmission control according to the present embodiment.

The communication apparatus 11 determines, based on any of a communication state, a communication amount, and the type of transmitted data regarding the wireless communication with the communication apparatus 12, whether or not to apply retransmission control (step S101). Subsequently, the communication apparatus 11 generates a control signal including information indicating whether or not to apply retransmission control, and transmits the control signal to the communication apparatus 12 (step S102).

On the other hand, in response to receipt of the control signal, the communication apparatus 12 controls application of retransmission control in accordance with the information included in the control signal and indicating whether or not to apply retransmission control (step S103). Subsequently, the communication apparatus 11 and the communication apparatus 12 execute wireless communication in accordance with a control result of application of retransmission control (step S104).

Figure 3:
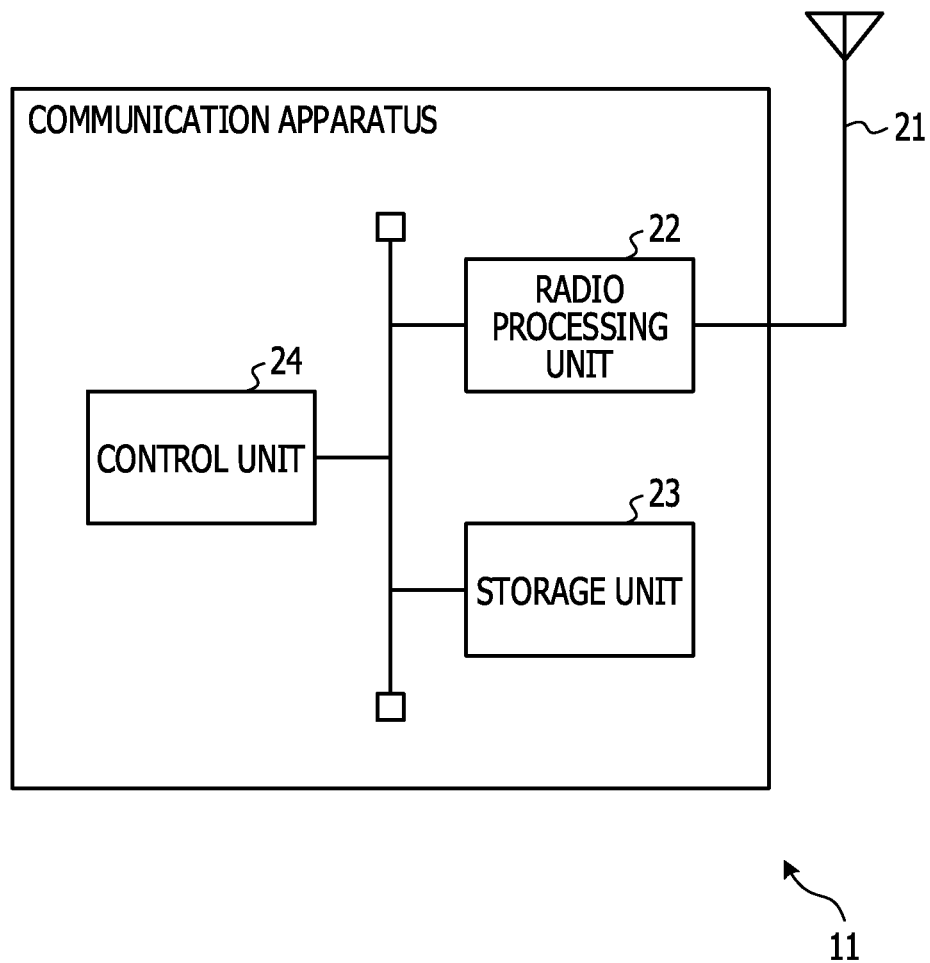
FIG. 3 is a schematic configuration diagram of one communication apparatus included in the wireless communication system according to the first embodiment.

FIG. 3 is a schematic configuration diagram of the communication apparatus 11. The communication apparatus 11 includes an antenna 21, a radio processing unit 22, a storage unit 23, and a control unit 24. The radio processing unit 22, the storage unit 23, and the control unit 24 are formed as separate circuits. Alternatively, these individual units may be mounted, in the communication apparatus 11, as one or a plurality of integrated circuits in which the circuits corresponding to the individual units are integrated.

The antenna 21 transmits a transmission signal received via the radio processing unit 22, the transmission signal being a radio signal. Also, the antenna 21 receives a radio signal from the communication apparatus 12, converts the radio signal into an electric signal to obtain a reception signal, and transmits the reception signal to the radio processing unit 22. The antenna 21 may include a transmitting antenna and a receiving antenna that are separated from each other.

The radio processing unit 22 converts the transmission signal received from the control unit 24 into an analog signal and then superimposes the transmission signal on a carrier wave having a radio frequency designated by the control unit 24. Subsequently, the radio processing unit 22 amplifies the transmission signal superimposed on the carrier wave to a desired level by using a high-power amplifier (not illustrated) and transmits the transmission signal to the antenna 21.

In addition, the radio processing unit 22 amplifies the reception signal received from the antenna 21 by using a low-noise amplifier (not illustrated). The radio processing unit 22 multiplies the amplified reception signal by a periodic signal having an intermediate frequency, thereby converting the frequency of the reception signal from a radio frequency to a baseband frequency. Subsequently, the radio processing unit 22 performs analog-to-digital conversion on the reception signal having the baseband frequency, and then transmits the reception signal to the control unit 24.

The storage unit 23 includes, for example, a rewritable nonvolatile semiconductor memory or volatile semiconductor memory. The storage unit 23 stores therein various pieces of information for communicating with the communication apparatus 12, various pieces of information that are to be transmitted by the communication apparatus 11 or that have been received by the communication apparatus 11, various programs to be executed by the communication apparatus 11, and so forth. Furthermore, the storage unit 23 stores therein various pieces of information that are used to determine whether or not to apply retransmission control.

The control unit 24 includes, for example, one or a plurality of processors and peripheral circuits thereof. The control unit 24 modulates a transmission signal in accordance with a predetermined modulation scheme and also multiplexes the transmission signal. Subsequently, the control unit 24 transmits the modulated and multiplexed transmission signal to the radio processing unit 22.

On the other hand, the control unit 24 demultiplexes the reception signal received from the radio processing unit 22 in accordance with a predetermined multiplexing scheme, and demodulates reception signals generated through the demultiplexing. Subsequently, the control unit 24 extracts various pieces of control information or data included in the demodulated reception signals. Subsequently, the control unit 24 executes a process in accordance with the extracted control information or data.

Furthermore, the control unit 24 executes various processes for executing wireless communication, such as transmission power control and call control.

Also, the control unit 24 executes various processes for determining whether or not to apply retransmission control.

Figure 4:
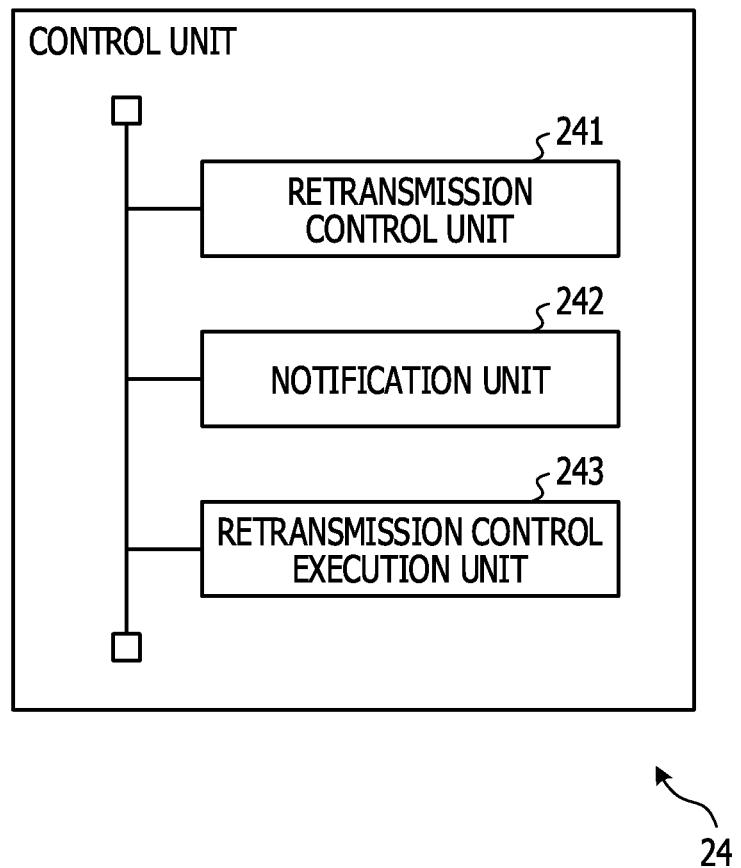
FIG. 4 is a functional block diagram of a control unit of the one communication apparatus related to retransmission control.

FIG. 4 is a functional block diagram of the control unit 24 related to retransmission control. The control unit 24 includes a retransmission control unit 241, a notification unit 242, and a retransmission control execution unit 243. These individual units included in the control unit 24 are implemented by a computer program that runs on a processor included in the control unit 24. Alternatively, these individual units included in the control unit 24 may be implemented, as one or a plurality of integrated circuits in which circuits for executing the functions of the individual units are integrated, in the communication apparatus 11 separately from the processor included in the control unit 24.

The retransmission control unit 241 determines whether or not to apply retransmission control, in accordance with a communication state or a communication amount of the wireless communication between the communication apparatus 11 and the communication apparatus 12, or the type of data transmitted between the communication apparatus 11 and the communication apparatus 12.

For example, the retransmission control unit 241 may determine not to apply retransmission control when the value of a parameter representing radio quality of a radio signal received from the communication apparatus 12 satisfies a predetermined quality standard. On the other hand, the retransmission control unit 241 may determine to apply retransmission control when the value of the parameter representing the radio quality does not satisfy the predetermined quality standard.

Alternatively, the retransmission control unit 241 may determine not to apply retransmission control when the amount of data transmitted at one time is smaller than or equal to a predetermined threshold, and may determine to apply retransmission control when the amount of data transmitted at one time is larger than the predetermined threshold. Alternatively, the retransmission control unit 241 may determine not to apply retransmission control when the relative speed of the communication apparatus 12 to the communication apparatus 11 is lower than or equal to a predetermined threshold, and may determine to apply retransmission control when the relative speed is higher than the predetermined threshold. Alternatively, the retransmission control unit 241 may determine to apply retransmission control when the communication apparatus 11 is able to set a plurality of communication available ranges and the communication apparatus 12 moves from one of the communication available ranges to another one of the communication available ranges in a latest predetermined period. On the other hand, when the communication apparatus 12 stays within any one of the communication available ranges in the latest predetermined period, the communication apparatus 11 may determine not to apply retransmission control.

Furthermore, the retransmission control unit 241 may determine not to apply retransmission control when the data transmitted from the communication apparatus 12 to the communication apparatus 11 is data of LLC Traffic, such as streaming data or voice call data. Also, the retransmission control unit 241 may determine not to apply retransmission control when the data transmitted from the communication apparatus 12 to the communication apparatus 11 is data that is transmitted at a regular interval, such as data of Internet of Things (IoT). On the other hand, when the data transmitted from the communication apparatus 12 to the communication apparatus 11 is data that is requested to be normally reproduced in the communication apparatus 11 or an apparatus to which the data is transferred via the communication apparatus 11, the retransmission control unit 241 may determine to apply retransmission control.

Furthermore, the retransmission control unit 241 may determine, based on a combination of two or more among a communication state, a communication amount, and the type of data, for example, whether or not to apply retransmission control. For example, the retransmission control unit 241 may determine to apply retransmission control when a condition for applying retransmission control is satisfied regarding any of the foregoing several example parameters, and otherwise, the retransmission control unit 241 may determine not to apply retransmission control.

The retransmission control unit 241 transmits information indicating whether or not to apply retransmission control to the notification unit 242 and the retransmission control execution unit 243.

Every time the retransmission control unit 241 determines whether or not to apply retransmission control, the notification unit 242 generates a control signal including information indicating whether or not to apply retransmission control. This control signal is an example of a transmission signal transmitted from the communication apparatus 11 to the communication apparatus 12. Subsequently, the notification unit 242 transmits the control signal to the communication apparatus 12 via the radio processing unit 22 and the antenna 21.

The retransmission control execution unit 243 executes retransmission control.

Figure 5:
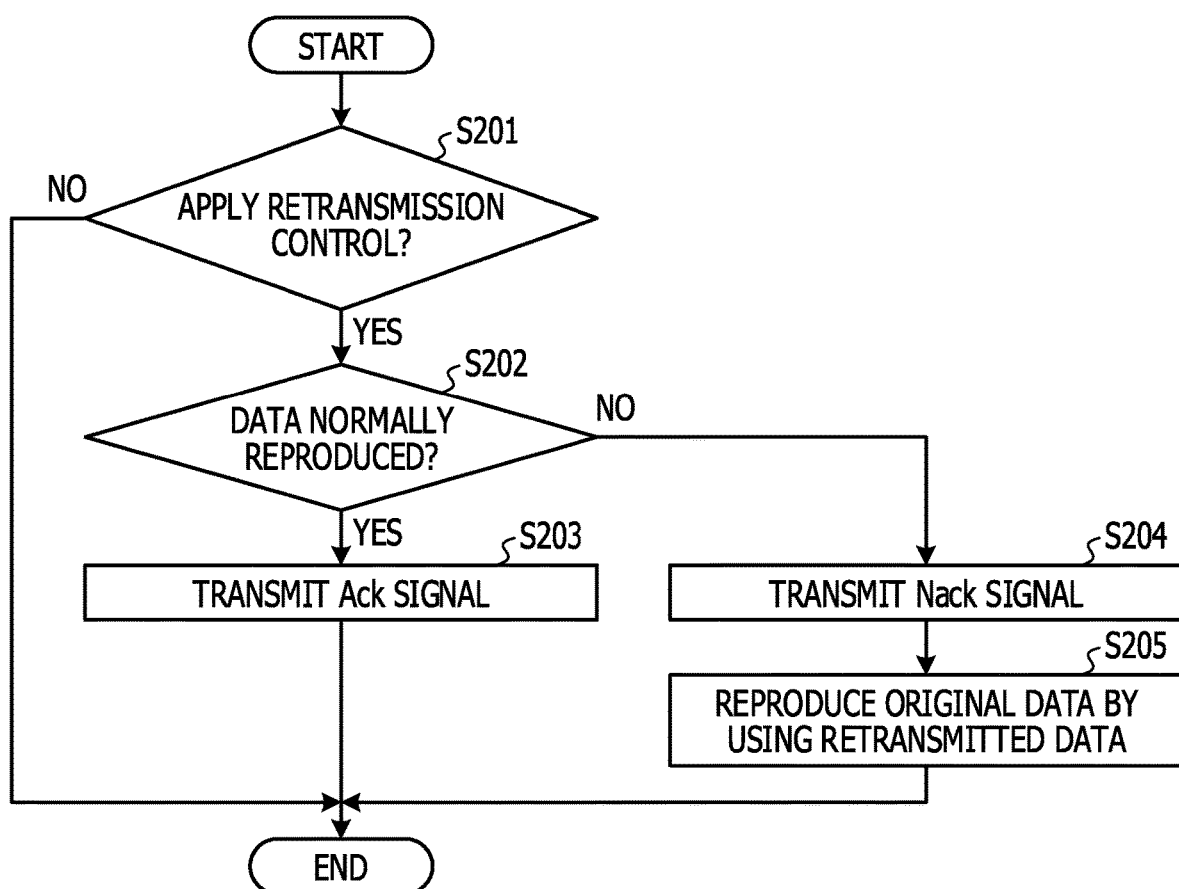
FIG. 5 is an operation flowchart of the one communication apparatus related to retransmission control.

FIG. 5 is a flowchart of an operation of the communication apparatus 11 related to retransmission control, executed by the retransmission control execution unit 243.

The retransmission control execution unit 243 determines, based on the information received from the retransmission control unit 241 and indicating whether or not to apply retransmission control, whether or not to apply retransmission control (step S201). When retransmission control is applied (YES in step S201), the retransmission control execution unit 243 executes, in accordance with the application of retransmission control, an error detection process corresponding to an error detection code added to data included in a reception signal from the communication apparatus 12 on the data. Subsequently, the retransmission control execution unit 243 determines whether or not the data is normally reproduced (step S202). Subsequently, the retransmission control execution unit 243 generates, for example, a response signal that varies in accordance with whether or not the data included in the reception signal has normally been reproduced. For example, when the data included in the reception signal is normally reproduced (YES in step S202), the retransmission control execution unit 243 generates an ACK signal and transmits the ACK signal to the communication apparatus 12 via the radio processing unit 22 and the antenna 21 (step S203).

On the other hand, when the data included in the reception signal is not normally reproduced (NO in step S202), the retransmission control execution unit 243 generates a NACK signal and transmits the NACK signal to the communication apparatus 12 via the radio processing unit 22 and the antenna 21 (step S204). The NACK signal is an example of a retransmission request signal for requesting retransmission of data to the communication apparatus 12. Subsequently, the retransmission control execution unit 243 the data included in the original reception signal by using data retransmitted in accordance with retransmission control adopted by the wireless communication system 1 (step S205). The retransmission control execution unit 243 may repeat the process from step S202 as appropriate.

On the other hand, when retransmission control is not applied in step S201 (NO in step S201), the retransmission control execution unit 243 does not execute retransmission control. Thus, the retransmission control execution unit 243 does not generate a response signal such as ACK or NACK regardless of whether or not the data included in the reception signal received from the communication apparatus 12 is normally reproduced.

Figure 6:
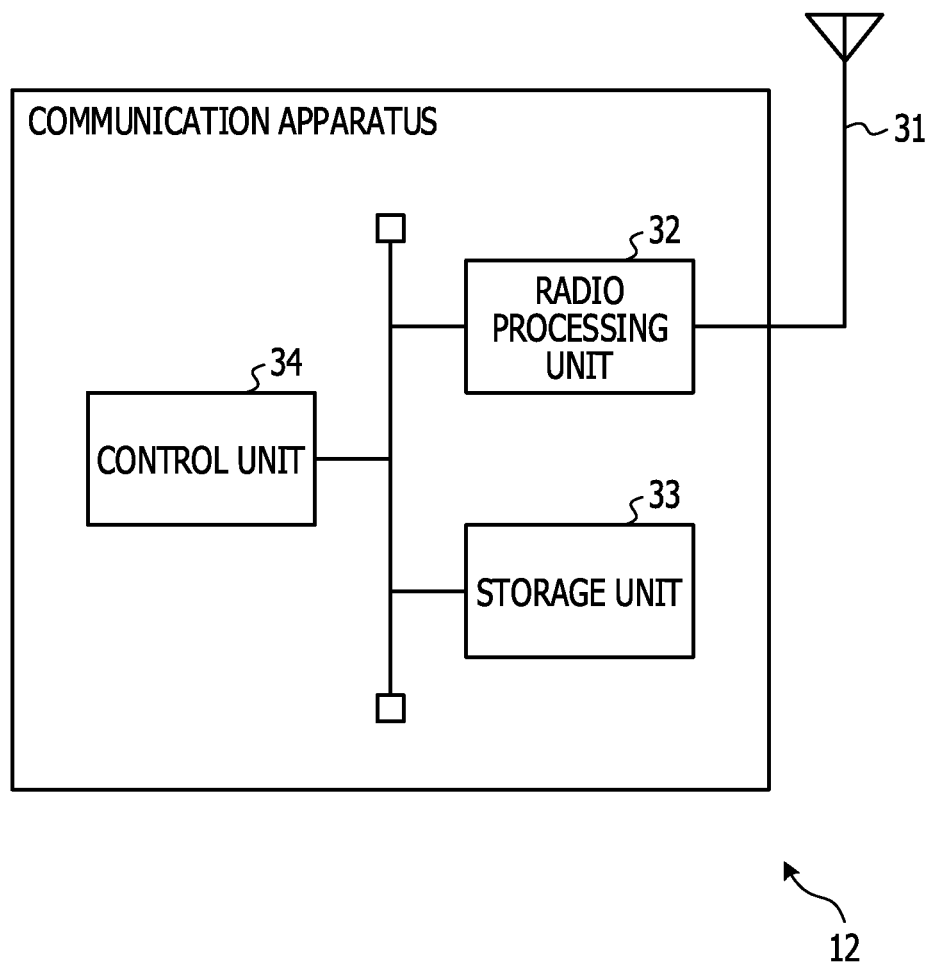
FIG. 6 is a schematic configuration diagram of another communication apparatus included in the wireless communication system according to the first embodiment.

FIG. 6 is a schematic configuration diagram of the communication apparatus 12. The communication apparatus 12 includes an antenna 31, a radio processing unit 32, a storage unit 33, and a control unit 34. The radio processing unit 32, the storage unit 33, and the control unit 34 are formed as separate circuits. Alternatively, these individual units may be may be mounted, in the communication apparatus 12, as one or a plurality of integrated circuits in which the circuits corresponding to the individual units are integrated.

The antenna 31 transmits a transmission signal received via the radio processing unit 32, the transmission signal being a radio signal. Also, the antenna 31 receives a radio signal from the communication apparatus 11, converts the radio signal into an electric signal to obtain a reception signal, and transmits the reception signal to the radio processing unit 32. The antenna 31 may include a transmitting antenna and a receiving antenna that are separated from each other.

The radio processing unit 32 converts the transmission signal received from the control unit 34 into an analog signal and then superimposes the transmission signal on a carrier wave having a radio frequency designated by the control unit 34. Subsequently, the radio processing unit 32 amplifies the transmission signal superimposed on the carrier wave to a desired level by using a high-power amplifier (not illustrated) and transmits the transmission signal to the antenna 31.

In addition, the radio processing unit 32 amplifies the reception signal received from the antenna 31 by using a low-noise amplifier (not illustrated). The radio processing unit 32 multiplies the amplified reception signal by a periodic signal having an intermediate frequency, thereby converting the frequency of the reception signal from a radio frequency to a baseband frequency. Subsequently, the radio processing unit 32 performs analog-to-digital conversion on the reception signal having the baseband frequency, and then transmits the reception signal to the control unit 34.

The storage unit 33 includes, for example, a rewritable nonvolatile semiconductor memory or volatile semiconductor memory. The storage unit 33 stores therein various pieces of information for communicating with the communication apparatus 11, various pieces of information that are to be transmitted by the communication apparatus 12 or that have been received by the communication apparatus 12, various programs to be executed by the communication apparatus 12, and so forth. Furthermore, the storage unit 33 stores therein various pieces of information that are used to execute retransmission control. Furthermore, when retransmission control is applied, the storage unit 33 stores, for a predetermined period, a transmission signal that has been transmitted.

The control unit 34 includes, for example, one or a plurality of processors and peripheral circuits thereof. The control unit 34 modulates a transmission signal in accordance with a predetermined modulation scheme and also multiplexes the transmission signal. Subsequently, the control unit 34 transmits the modulated and multiplexed transmission signal to the radio processing unit 32.

On the other hand, the control unit 34 demultiplexes the reception signal received from the radio processing unit 32 in accordance with a predetermined multiplexing scheme, and demodulates reception signals generated through the demultiplexing. Subsequently, the control unit 34 extracts various pieces of control information or data included in the demodulated reception signals. Subsequently, the control unit 34 executes a process in accordance with the extracted control information or data.

Furthermore, the control unit 34 executes various processes for executing wireless communication, such as transmission power control and call control.

In addition, every time the control unit 34 receives a control signal including information indicating whether or not to apply retransmission control from the communication apparatus 11, the control unit 34 refers to the information and controls application of retransmission control.

Figure 7:
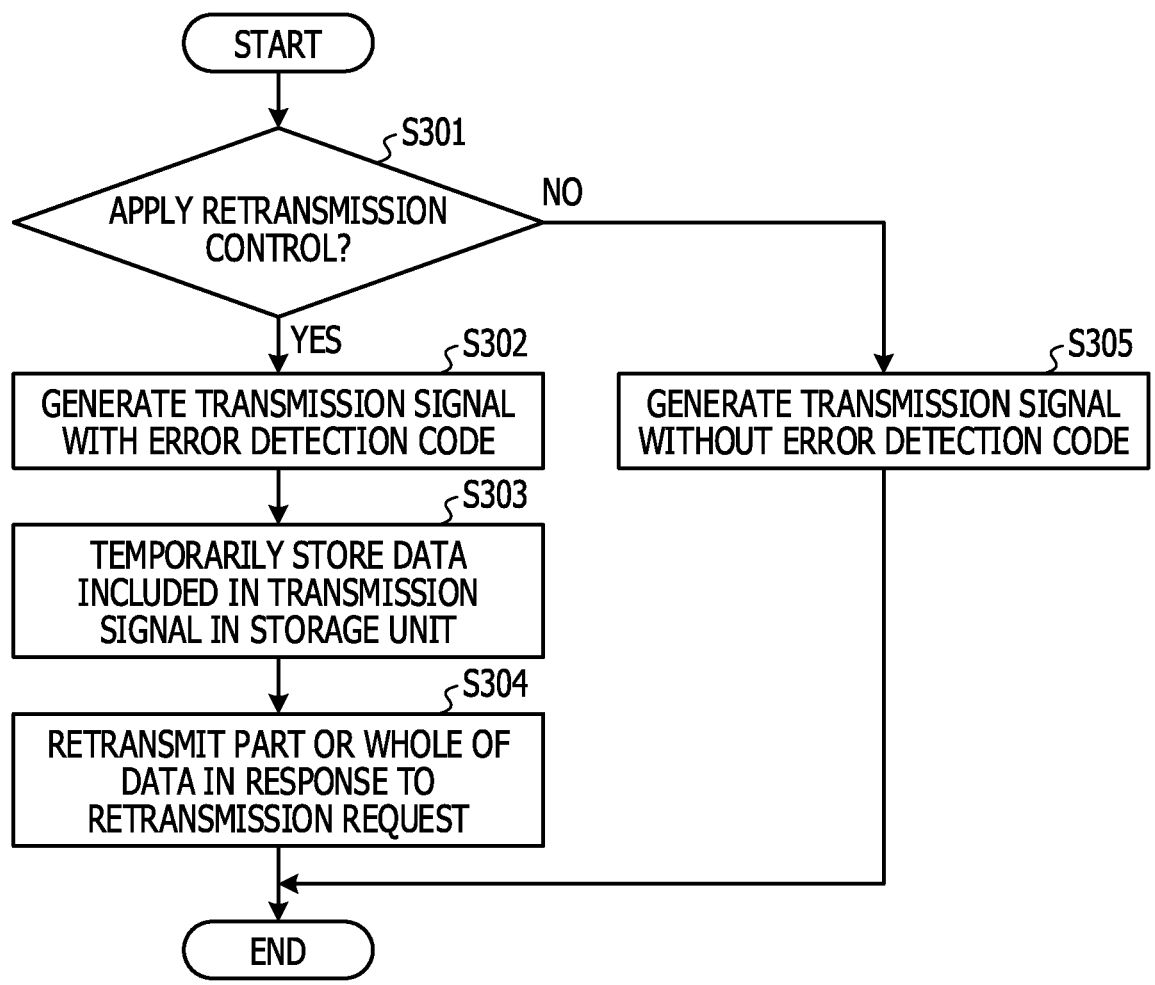
FIG. 7 is an operation flowchart of the other communication apparatus related to retransmission control.

FIG. 7 is a flowchart of an operation of the communication apparatus 12 related to retransmission control, executed by the control unit 34.

The control unit 34 determines whether or not a received control signal includes information indicating that retransmission control is applied (step S301).

When the received control signal includes information indicating that retransmission control is applied (YES in step S301), the control unit 34 applies retransmission control. In this case, the control unit 34 generates a transmission signal to be transmitted to the communication apparatus 11 by adding an error detection code related to retransmission control to data included in the transmission signal (step S302). Subsequently, the control unit 34 transmits the transmission signal to the communication apparatus 11 via the radio processing unit 32 and the antenna 31.

In addition, the control unit 34 causes the data included in the transmission signal transmitted to the communication apparatus 11 to be kept stored in the storage unit 33 until it is determined that the transmitted data has normally been reproduced in the communication apparatus 11 or until a predetermined period elapses, so that the data may be retransmitted (step S303). When the control unit 34 receives a signal requesting retransmission (for example, a NACK signal) from the communication apparatus 11, the control unit 34 generates a transmission signal to be retransmitted, including part or whole of the data included in the transmission signal. The control unit 34 transmits the generated transmission signal to the communication apparatus 11 via the radio processing unit 32 and the antenna 31 (step S304).

On the other hand, when the received control signal includes information indicating that retransmission control is not applied in step S301 (NO in step S301), the control unit 34 does not apply retransmission control. In this case, the control unit 34 generates a transmission signal to be transmitted to the communication apparatus 11 without adding an error detection code related to retransmission control to the data included in the transmission signal (step S305). Subsequently, the control unit 34 transmits the transmission signal to the communication apparatus 11 via the radio processing unit 32 and the antenna 31. In this case, the control unit 34 may discard the data included in the transmission signal transmitted to the communication apparatus 11, without storing the data in the storage unit 33.

As described above, in this wireless communication system, one of communication apparatuses determines whether or not to apply retransmission control and notifies the other communication apparatus whether or not to apply retransmission control. The other communication apparatus controls application of retransmission control in accordance with the notification. Accordingly, this wireless communication system is able to dynamically switch whether or not to apply retransmission control, and is thus able to suppress a decrease in communication efficiency caused by retransmission control when retransmission control is not to be applied. As a result, this wireless communication system and each communication apparatus included in this wireless communication system are able to increase communication efficiency.

Next, a description will be given of a wireless communication system according to a second embodiment. This wireless communication system includes a base station and a mobile station. The base station determines, based on a communication state or a communication amount of the wireless communication with the mobile station, whether or not to apply retransmission control, and transmits a control signal including information indicating whether or not to apply retransmission control to the mobile station. The mobile station controls application of retransmission control in accordance with the information.

Figure 8:
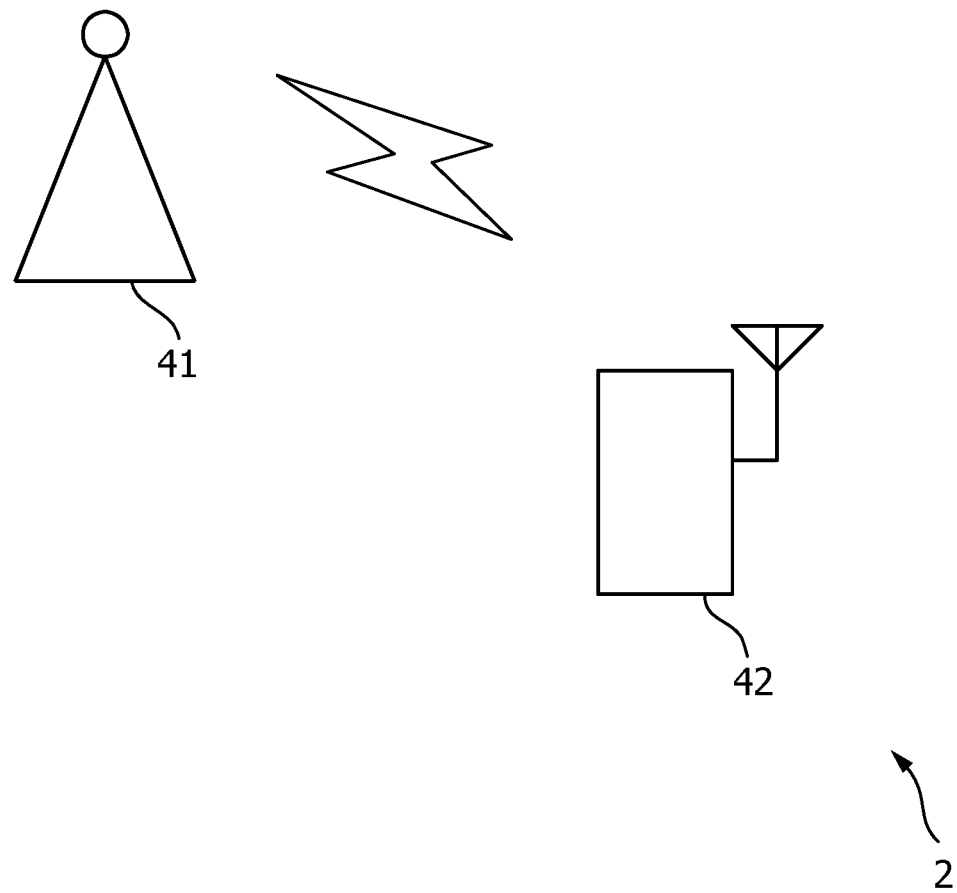
FIG. 8 is a schematic configuration diagram of a wireless communication system according to a second embodiment.

FIG. 8 is a schematic configuration diagram of the wireless communication system according to the second embodiment. A wireless communication system 2 according to the second embodiment includes a base station 41 and a mobile station 42. Each of the base station 41 and the mobile station 42 is an example of a communication apparatus. The number of base stations included in the wireless communication system 2 is not limited to one, and a plurality of base stations may be included. Also, the number of mobile stations included in the wireless communication system 2 is not limited to one, and a plurality of mobile stations may be included.

The base station 41 and the mobile station 42 execute a communication process related to retransmission control in accordance with the operation sequence illustrated in FIG. 2. In the present embodiment, the communication process related to retransmission control may be executed, with the communication apparatus 11 in FIG. 2 being the base station 41 and the communication apparatus 12 in FIG. 2 being the mobile station 42.

That is, the base station 41 determines, at a regular interval or at predetermined timing, whether or not to apply retransmission control in accordance with a communication state or a communication amount of the wireless communication between the base station 41 and the mobile station 42, like the communication apparatus 11 in the first embodiment. The predetermined timing may be, for example, the time of handover or the time of connection request.

Every time the base station 41 determines whether or not to apply retransmission control, the base station 41 generates a control signal including information indicating whether or not to apply retransmission control and transmits the control signal to the mobile station 42. In addition, the base station 41 controls application of retransmission control in accordance with a determination result of whether or not to apply retransmission control in the wireless communication with the mobile station 42. That is, when retransmission control is not applied, the base station 41 does not transmit a response signal such as ACK or NACK to the communication apparatus 12 regardless of whether or not data included in an uplink signal received from the mobile station 42 is normally reproduced.

On the other hand, when retransmission control is applied, the base station 41 executes, on a radio signal, an error detection process corresponding to an error detection code added to the radio signal in accordance with application of retransmission control, thereby determining whether or not the data included in the radio signal is normally reproduced. Subsequently, the base station 41 transmits a response signal to the mobile station 42, the response signal varying in accordance with, for example, whether or not the data included in the uplink signal received from the mobile station 42 has normally been reproduced.

On the other hand, like the communication apparatus 12 in the first embodiment, every time the mobile station 42 receives a downlink control signal including information indicating whether or not to apply retransmission control from the base station 41, the mobile station 42 controls application of retransmission control by referring to the information. That is, when the received control signal includes information indicating that retransmission control is not applied, the mobile station 42 does not apply retransmission control. In this case, the mobile station 42 does not add an error detection code related to retransmission control to the data included in the uplink signal to be transmitted to the base station 41. In addition, in this case, the data included in the uplink signal that has already been transmitted to the base station 41 is not retransmitted, and thus the mobile station 42 may discard the data included in the uplink signal that has already been transmitted, without storing the data in the storage unit.

On the other hand, when the received control signal includes information indicating that retransmission control is applied, the mobile station 42 applies retransmission control. In this case, the mobile station 42 adds an error detection code related to retransmission control to the uplink signal to be transmitted to the base station 41. In addition, the mobile station 42 causes the data included in the uplink signal transmitted to the base station 41 to be kept stored in the storage unit until it is determined that the transmitted data has normally been reproduced in the base station 41 or until a certain period elapses, so that the data may be retransmitted. When the mobile station 42 receives a signal requesting retransmission (for example, a NACK signal) from the base station 41, the mobile station 42 retransmits part or whole of the data in accordance with the signal.

When there are a plurality of mobile stations connected to the base station 41, the base station 41 may determine, for each mobile station, whether or not to apply retransmission control. Also, the base station 41 may transmit, to each mobile station, a control signal including information indicating whether or not to apply retransmission control for the mobile station.

Figure 9:
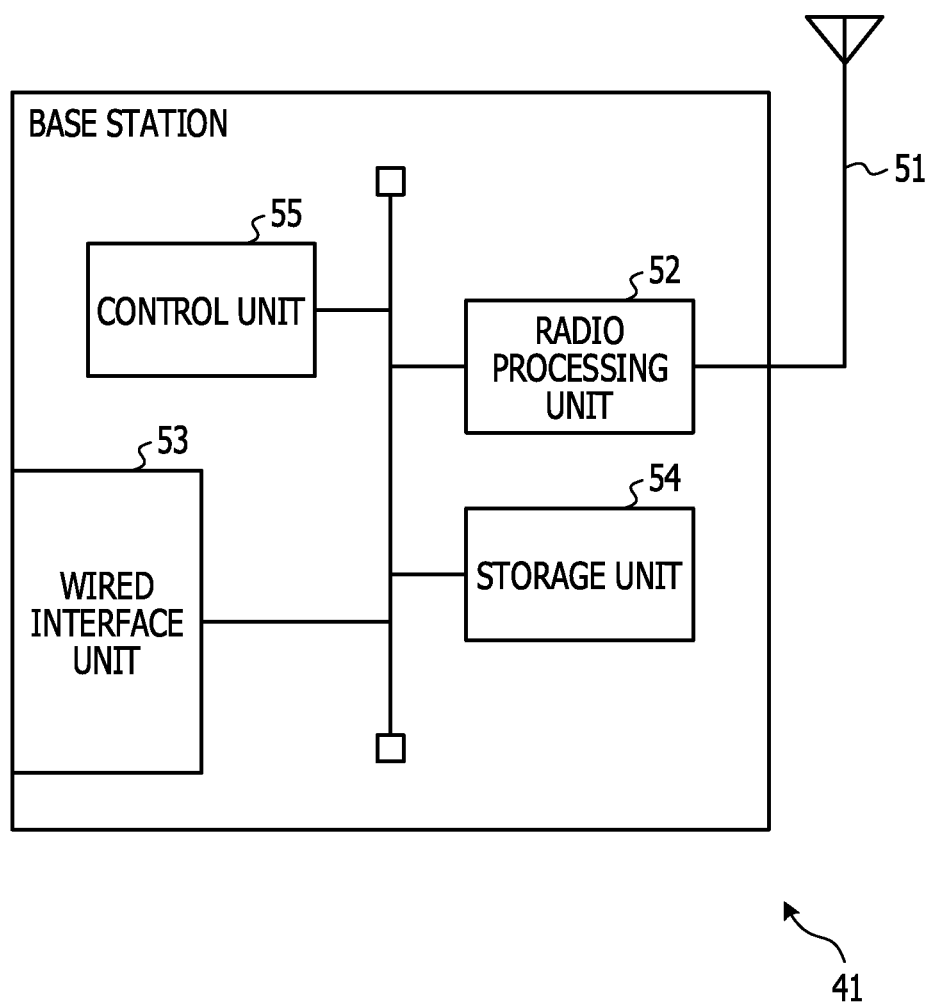
FIG. 9 is a schematic configuration diagram of a base station.

FIG. 9 is a schematic configuration diagram of the base station 41. The base station 41 includes an antenna 51, a radio processing unit 52, a wired interface unit 53, a storage unit 54, and a control unit 55. The radio processing unit 52, the storage unit 54, and the control unit 55 are formed as separate circuits. Alternatively, these individual units may be implemented, in the base station 41, as one or a plurality of integrated circuits in which the circuits corresponding to the individual units are integrated.

The antenna 51 transmits a downlink signal received via the radio processing unit 52, the downlink signal being a radio signal. Also, the antenna 51 receives a radio signal from the mobile station 42, converts the radio signal into an electric signal to obtain an uplink signal, and transmits the uplink signal to the radio processing unit 52. The antenna 51 may include a transmitting antenna and a receiving antenna that are separated from each other.

The radio processing unit 52 converts the downlink signal received from the control unit 55 into an analog signal and then superimposes the downlink signal on a carrier wave having a radio frequency designated by the control unit 55. Subsequently, the radio processing unit 52 amplifies the downlink signal superimposed on the carrier wave to a desired level by using a high-power amplifier (not illustrated) and transmits the downlink signal to the antenna 51.

In addition, the radio processing unit 52 amplifies the uplink signal received from the antenna 51 by using a low-noise amplifier (not illustrated). The radio processing unit 52 multiplies the amplified uplink signal by a periodic signal having an intermediate frequency, thereby converting the frequency of the uplink signal from a radio frequency to a baseband frequency. Subsequently, the radio processing unit 52 performs analog-to-digital conversion on the uplink signal having the baseband frequency, and then transmits the uplink signal to the control unit 55.

The wired interface unit 53 includes a communication interface circuit for connecting the base station 41 to a host node apparatus (not illustrated) and another base station. The wired interface unit 53 analyzes, in accordance with an S1 interface, a signal received from the host node apparatus, and extracts a downlink signal and a control signal included in the received signal. Furthermore, the wired interface unit 53 analyses, in accordance with an X2 interface, a signal received from another base station, and extracts a control signal included in the received signal. Subsequently, the wired interface unit 53 transmits the extracted downlink signal and control signal to the control unit 55.

On the other hand, the wired interface unit 53 converts an uplink signal received from the control unit 55 into a signal of a format conforming to the S1 interface and outputs the converted signal to the host node apparatus. Also, the wired interface unit 53 converts a control signal to be transmitted to another base station into a signal of a format conforming to the X2 interface. Subsequently, the wired interface unit 53 outputs the control signal to the other base station.

The storage unit 54 includes, for example, a rewritable nonvolatile semiconductor memory or volatile semiconductor memory. The storage unit 54 stores therein various pieces of information for communicating with the mobile station 42, various pieces of information that are to be transmitted by the base station 41 or that have been received by the base station 41, various programs to be executed by the base station 41, and so forth. Furthermore, the storage unit 54 stores therein various pieces of information that are used to determine whether or not to apply retransmission control.

The control unit 55 includes, for example, one or a plurality of processors and peripheral circuits thereof. The control unit 55 modulates and multiplexes a downlink signal in accordance with a modulation and multiplexing scheme that is adopted in the communication standard to which the wireless communication system 2 conforms. Subsequently, the control unit 55 transmits the modulated and multiplexed downlink signal to the radio processing unit 52. For example, the control unit 55 modulates and multiplexes the downlink signal in accordance with Orthogonal Frequency-Division Multiple Access (OFDMA).

On the other hand, the control unit 55 demultiplexes the uplink signal received from the radio processing unit 52 in accordance with a modulation and multiplexing scheme that is adopted in the communication standard to which the wireless communication system 2 conforms, and demodulates reception signals generated through the demultiplexing. For example, the control unit 55 demultiplexes the uplink signal in accordance with Single-Carrier Frequency Division Multiple Access (SC-FDMA) or a multiplexing scheme equivalent to another FDMA scheme, and demodulates the uplink signal. Subsequently, the control unit 55 outputs the demodulated uplink signal to the wired interface unit 53. Furthermore, the control unit 55 extracts, from the demodulated uplink signal, various signals that the base station 41 refers to, for example, control information about call control, or a parameter or the like representing a communication state or a communication amount from the mobile station 42.

Furthermore, the control unit 55 executes various processes for executing wireless communication, such as transmission power control and call control. Also, the control unit 55 executes various processes for determining whether or not to apply retransmission control. For this purpose, the control unit 55 includes, like the control unit 24 of the communication apparatus 11 according to the first embodiment illustrated in FIG. 4, the retransmission control unit 241, the notification unit 242, and the retransmission control execution unit 243 related to retransmission control.

The retransmission control unit 241 determines whether or not to apply retransmission control, for example, based on a communication state or a communication amount of the wireless communication between the base station 41 and the mobile station 42. As the retransmission control, HARQ is used, for example.

For example, the retransmission control unit 241 may determine not to apply retransmission control when the value of a parameter representing the radio quality of a downlink signal or an uplink signal satisfies a predetermined quality standard. The parameter representing the radio quality is an example of a parameter representing the communication state of the wireless communication between the base station 41 and the mobile station 42. On the other hand, when the value of the parameter representing the radio quality does not satisfy the predetermined quality standard, the retransmission control unit 241 may determine to apply retransmission control. For example, as the parameter representing the radio quality, a Channel Quality Indicator (CQI) is used. In this case, the retransmission control unit 241 compares a CQI included in a measurement report received by the base station 41 from the mobile station 42 with a predetermined threshold. The retransmission control unit 241 may determine not to apply retransmission control when the CQI is larger than or equal to the predetermined threshold, and may determine to apply retransmission control when the CQI is smaller than the predetermined threshold.

Alternatively, a measured vale of a Sounding Reference Signal (SRS) transmitted from the mobile station 42 may be used as the parameter representing the radio quality. Also in this case, the retransmission control unit 241 compares the measured value with the threshold. The retransmission control unit 241 may determine not to apply retransmission control when the measured value is larger than or equal to the predetermined threshold, and may determine to apply retransmission control when the measured value is smaller than the predetermined threshold.

Alternatively, the retransmission control unit 241 may determine not to apply retransmission control when the relative speed of the mobile station 42 to the base station 41 is lower than or equal to a predetermined threshold, and may determine to apply retransmission control when the relative movement speed is higher than the predetermined threshold. The relative speed of the mobile station 42 to the base station 41 is another example of the parameter representing the communication state of the wireless communication between the base station 41 and the mobile station 42. In this case, the retransmission control unit 241 may use, to determine whether or not to apply retransmission control, the movement speed of the mobile station 42 that is estimated by measuring a Doppler frequency and reported from the mobile station 42, for example. Alternatively, the retransmission control unit 241 may calculate the speed of the mobile station 42, based on a change in position information of the mobile station 42 over time.

Alternatively, the retransmission control unit 241 may determine to apply retransmission control when the base station 41 is able to set a plurality of communication available ranges and the mobile station 42 moves from one of the communication available ranges to another one of the communication available ranges in a latest predetermined period. On the other hand, when the mobile station 42 stays within any one of the communication available ranges in the latest predetermined period, the retransmission control unit 241 may determine not to apply retransmission control. Whether or not the mobile station 42 has moved between communication available ranges is another example of the parameter representing the communication state of the wireless communication between the base station 41 and the mobile station 42. Each communication available range may be, for example, a cell or a beam.

Alternatively, the retransmission control unit 241 may determine not to apply retransmission control when the size of a transport block is smaller than or equal to a predetermined threshold and may determine to apply retransmission control when the size of the transport block is larger than the predetermined threshold. The size of the transport block is an example of the parameter representing a communication amount.

Furthermore, the retransmission control unit 241 may determine, based on a combination of a communication state and a communication amount, for example, whether or not to apply retransmission control. For example, the retransmission control unit 241 may determine to apply retransmission control when the condition for applying retransmission control is satisfied regarding any of the foregoing example parameters. Otherwise, the retransmission control unit 241 may determine not to apply retransmission control.

The retransmission control unit 241 transmits information indicating whether or not to apply retransmission control to the notification unit 242 and the retransmission control execution unit 243.

Every time the retransmission control unit 241 determines whether or not to apply retransmission control or at a regular interval, the notification unit 242 generates a control signal including information indicating whether or not to apply retransmission control. Subsequently, the notification unit 242 transmits the control signal to the mobile station 42 via the radio processing unit 52 and the antenna 51. The notification unit 242 may use, as the control signal, a signal that is transmitted through a Physical Downlink Control CHannel (PDCCH). Alternatively, the notification unit 242 may use, as the control signal, a signal of a MAC control element (MAC CE) or a signal of Radio Resource Control (RRC).

The retransmission control execution unit 243 executes retransmission control in accordance with, for example, the operation flowchart illustrated in FIG. 5, like the communication apparatus 11 in the first embodiment. That is, when retransmission control is applied, the retransmission control execution unit 243 executes, on an uplink signal, an error detection process corresponding to an error detection code added to the uplink signal in accordance with application of retransmission control adopted in the wireless communication system 2. Accordingly, the retransmission control execution unit 243 determines whether or not the data included in the uplink signal is normally reproduced. For example, the retransmission control execution unit 243 determines, based on a CRC code added to a transport block included in the uplink signal, whether or not the transport block is. When the data included in the uplink signal is, the retransmission control execution unit 243 generates an ACK signal and transmits the ACK signal to the mobile station 42 via the radio processing unit 52 and the antenna 51. On the other hand, when the data included in the uplink signal is not, the retransmission control execution unit 243 generates a NACK signal and transmits the NACK signal to the mobile station 42 via the radio processing unit 52 and the antenna 51. In addition, the retransmission control execution unit 243 reproduces the data included in the original uplink signal by using the data retransmitted from the mobile station 42.

On the other hand, when retransmission control is not applied, the retransmission control execution unit 243 does not generate a response signal such as ACK or NACK regardless of whether or not the data included in the radio signal received from the mobile station 42 is.

Figure 10:
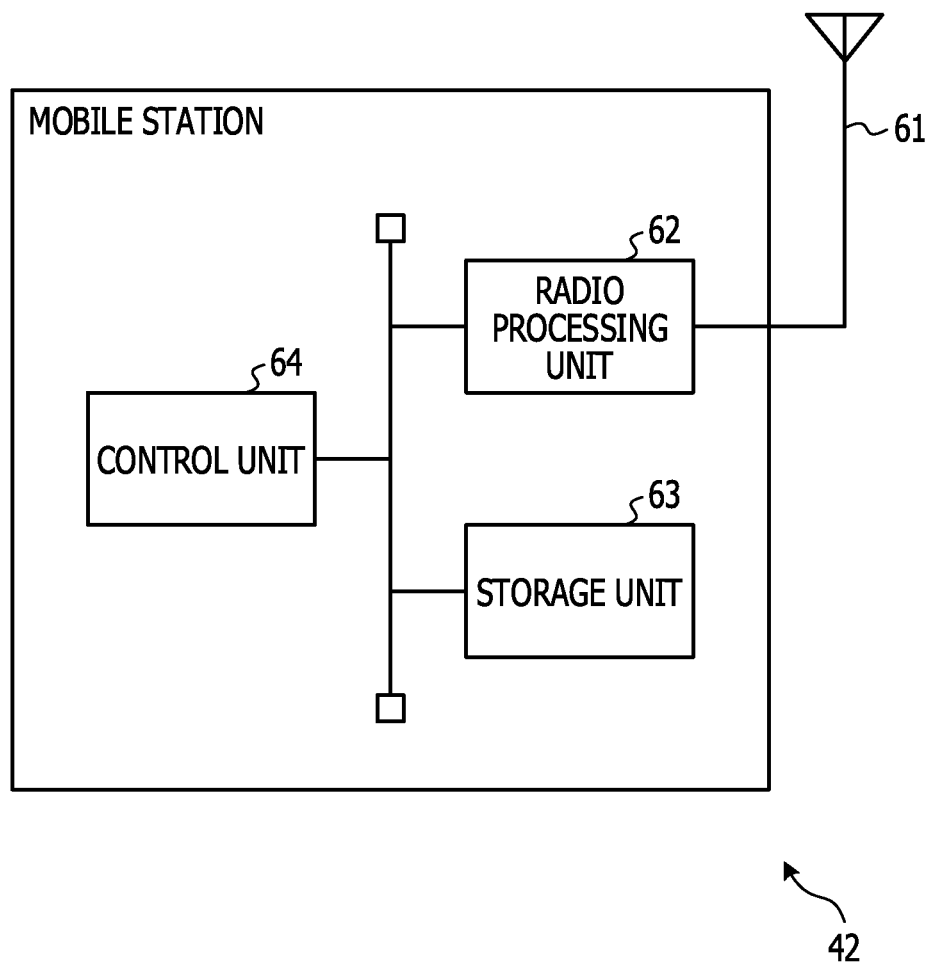
FIG. 10 is a schematic configuration diagram of a mobile station.

FIG. 10 is a schematic configuration diagram of the mobile station 42. The mobile station 42 includes an antenna 61, a radio processing unit 62, a storage unit 63, and a control unit 64. Furthermore, the mobile station 42 may include one or more among a user interface such as a touch screen (not illustrated), a microphone (not illustrated), a speaker (not illustrated), and a camera (not illustrated. Furthermore, the mobile station 42 may include a Global Positioning System (GPS) receiver (not illustrated) for measuring the position of the mobile station 42. The radio processing unit 62, the storage unit 63, and the control unit 64 are formed as separate circuits. Alternatively, these individual units may be, in the mobile station 42, as one or a plurality of integrated circuits in which the circuits corresponding to the individual units are integrated.

The antenna 61 transmits an uplink signal received via the radio processing unit 62, the uplink signal being a radio signal. Also, the antenna 61 receives a radio signal from the base station 41, converts the radio signal into an electric signal to obtain a downlink signal, and transmits the downlink signal to the radio processing unit 62. The antenna 61 may include a transmitting antenna and a receiving antenna that are separated from each other.

The radio processing unit 62 converts the uplink signal received from the control unit 64 into an analog signal and then superimposes the uplink signal on a carrier wave having a radio frequency designated by the control unit 64. Subsequently, the radio processing unit 62 amplifies the uplink signal superimposed on the carrier wave to a desired level by using a high-power amplifier (not illustrated) and transmits the uplink signal to the antenna 61.

In addition, the radio processing unit 62 amplifies the downlink signal received from the antenna 61 by using a low-noise amplifier (not illustrated). The radio processing unit 62 multiplies the amplified downlink signal by a periodic signal having an intermediate frequency, thereby converting the frequency of the downlink signal from a radio frequency to a baseband frequency. Subsequently, the radio processing unit 62 performs analog-to-digital conversion on the downlink signal having the baseband frequency, and then transmits the downlink signal to the control unit 64.

The storage unit 63 includes, for example, a rewritable nonvolatile semiconductor memory or volatile semiconductor memory. The storage unit 63 stores therein various pieces of information for communicating with the base station 41, various pieces of information that are to be transmitted by the mobile station 42 or that have been received by the mobile station 42, various programs to be executed by the mobile station 42, and so forth. Furthermore, the storage unit 63 stores therein various pieces of information that are used to execute retransmission control. Furthermore, when retransmission control is applied, the storage unit 63 stores therein an uplink signal that has been transmitted for a predetermined period in accordance with retransmission control adopted by the wireless communication system 2, for example, HARQ.

The control unit 64 includes, for example, one or a plurality of processors and peripheral circuits thereof. The control unit 64 modulates and multiplexes an uplink signal in accordance with a modulation and multiplexing scheme that is adopted in the communication standard to which the wireless communication system 2 conforms. Subsequently, the control unit 64 transmits the modulated and multiplexed uplink signal to the radio processing unit 62. For example, the control unit 64 modulates and multiplexes the uplink signal in accordance with SC-FDMA or a multiplexing scheme equivalent to another FDMA scheme.

On the other hand, the control unit 64 demultiplexes the downlink signal received from the radio processing unit 62 in accordance with the modulation and multiplexing scheme that is adopted in the communication standard to which the wireless communication system 2 conforms, and demodulates reception signals generated through the demultiplexing. For example, the control unit 64 demultiplexes and demodulates the downlink signal in accordance with OFDMA. Subsequently, the control unit 64 extracts various pieces of control information or data included in the demodulated reception signal. Subsequently, the control unit 64 executes a process in accordance with the extracted control information or data. For example, when the downlink signal includes an audio signal, the control unit 64 reproduces the audio signal through a speaker. When the downlink signal includes a video signal, the control unit 64 reproduces the video signal through a touch screen.

Furthermore, the control unit 64 executes various processes for executing wireless communication with the base station 41, such as a connection request process.

Also, the control unit 64 executes various processes for executing retransmission control. The control unit 64 generates, at a regular interval or at predetermined timing, an uplink signal including information that is used to determine whether or not to apply retransmission control, for example, CQI, the speed of the mobile station 42, or the current position of the mobile station 42. The predetermined timing may be, for example, the time of handover or the time of connection request. Subsequently, the control unit 64 transmits the uplink signal to the base station 41 via the radio processing unit 62 and the antenna 61.

Every time the control unit 64 receives a control signal including information indicating whether or not to apply retransmission control from the base station 41, the control unit 64 controls application of retransmission control by referring to the information. For example, the control unit 64 may control application of retransmission control in accordance with, for example, the operation flowchart illustrated in FIG. 7, like the communication apparatus 12 in the second embodiment.

That is, when the received control signal includes information indicating that retransmission control is applied, the control unit 64 applies retransmission control. In this case, the control unit 64 adds an error detection code related to retransmission control to an uplink signal. The control unit 64 may use a CRC code as an error detection code, for example. In addition, the control unit 64 causes the uplink signal that has been transmitted to be kept stored in the storage unit 63 until receiving, from the base station 41, a signal (for example, an ACK signal) indicating that the transmitted data has or until a predetermined period elapses, so that the uplink signal may be retransmitted. When receiving a signal requesting retransmission (for example, a NACK signal) from the base station 41, the control unit 64 generates an uplink signal to be retransmitted including part or whole of the data included in the uplink signal. The control unit 64 transmits the generated uplink signal to the base station 41 via the radio processing unit 62 and the antenna 61.

On the other hand, when the received control signal includes information indicating that retransmission control is not applied, the control unit 64 does not apply retransmission control. In this case, the control unit 64 does not add an error detection code related to retransmission control to the data included in the uplink signal. In addition, in this case, the control unit 64 may discard the data included in the uplink signal transmitted to the base station 41 without storing the data in the storage unit 63.

FIG. 11A is a diagram illustrating an example of the structure of data transmitted by an uplink signal when retransmission control is applied, and FIG. 11B is a diagram illustrating an example of the structure of data transmitted by an uplink signal when retransmission control is not applied.

As illustrated in FIG. 11A, in a physical (PHY) layer, a CRC code 1102 with a predetermined length (for example, a length of 24 bits) is added to each code block 1101 included in an uplink signal. In the base station 41, it is determined, by using the CRC code 1102, whether or not each code block 1101 is normally reproduced. When retransmission control is applied, in a Media Access Control (MAC) layer, a transport block 1103 and a CRC code 1104 with a predetermined length (for example, a length of 24 bits) for retransmission control, for example, for ACK/NACK determination of HARQ, are obtained from one or more code blocks 1101. Based on the CRC code 1104, it is determined whether or not the transport block 1103 is. In a Radio Link Control (RLC) layer, an RLC Protocol Data Unit (RLC PDU) 1105 is obtained from the transport block 1103. The RLC PDU 1105 is divided into a plurality of RLC SDUs 1106. Each RLC SDU 1106 is transmitted, for example, from the base station 41 to the host node apparatus in the form of an IP packet.

On the other hand, as illustrated in FIG. 11B, also when retransmission control is not applied, it is determined whether or not each code block 1111 is, by using a CRC code 1112 with a predetermined length (for example, a length of 24 bits) added to each code block 1111 in the physical layer. In the MAC layer, a transport block 1113 is obtained from one or more code blocks 1111. However, when retransmission control is not applied, a CRC code for retransmission control is not added to the transport block 1113. In the RLC layer, an RLC PDU 1115 is obtained from the transport block 1113. The RLC PDU 1115 is divided into a plurality of RLC SDUs 1116. Each RLC SDU 1116 is transmitted, for example, from the base station 41 to the host node apparatus in the form of an IP packet.

For another example, as illustrated in FIG. 11C, in a layer in which a process related to retransmission control is executed on data 1120 included in a signal transmitted by an uplink signal, whether or not to add an error detection code 1121 for retransmission control may be switched. That is, when retransmission control is applied, the error detection code 1121 may be added to the data 1120. On the other hand, when retransmission control is not applied, the error detection code 1121 may be omitted. The error detection code 1121 may be a CRC code or may be another error detection code.

As described above, in the wireless communication system according to the second embodiment, the base station determines whether or not to apply retransmission control and notifies the mobile station whether or not to apply retransmission control. The mobile station controls application of retransmission control in accordance with the notification. Thus, this wireless communication system is able to dynamically switch whether or not to apply retransmission control, and is thus able to suppress a decrease in communication efficiency caused by retransmission control when retransmission control is not to be applied. As a result, this wireless communication system is able to increase communication efficiency.

According to a modification example, the mobile station may determine whether or not to apply retransmission control, generate an uplink control signal including information indicating whether or not to apply retransmission control, and transmit the control signal to the base station. The base station may control application of retransmission control in accordance with the information indicating whether or not to apply retransmission control, included in the control signal.

In this case, for example, the control unit 64 of the mobile station 42 illustrated in FIG. 10 may execute the process of each of the retransmission control unit 241, the notification unit 242, and the retransmission control execution unit 243 illustrated in FIG. 4. In this case, the control unit 64 may determine whether or not to apply retransmission control in accordance with, for example, the type of data transmitted from the base station 41 to the mobile station 42. For example, the control unit 64 may specify, based on an application program or the like that the control unit 64 is executing, the type of data transmitted from the base station 41 to the mobile station 42. When the data transmitted from the base station 41 to the mobile station 42 is data that is requested to be transmitted in real time, such as streaming data or voice call data, the control unit 64 may determine not to apply retransmission control. Also when the data transmitted from the base station 41 to the mobile station 42 is data that is transmitted at a regular interval, such as data of Internet of Things (IoT), the control unit 64 may determine not to apply retransmission control. On the other hand, when the data transmitted from the base station 41 to the mobile station 42 is data that is requested to be in the mobile station 42, for example, a certain computer program, the control unit 64 may determine to apply retransmission control.

Subsequently, the control unit 64 may generate an uplink control signal including information indicating whether or not to apply retransmission control and may transmit the control signal to the base station 41 via the radio processing unit 62 and the antenna 61.

On the other hand, the control unit 55 of the base station 41 may control, based on the uplink control signal received from the mobile station 42, application of retransmission control, like the control unit 64 of the mobile station 42.

According to another modification example, even when retransmission control is not applied, the base station 41 or the mobile station 42 may add an error detection code related to retransmission control to data included in a downlink signal or an uplink signal. Alternatively, the base station 41 or the mobile station 42 may cause an error detection code added to data when retransmission control is applied and an error detection code added to data when retransmission control is not applied to be different from each other. For example, the error correction capability of the error detection code (error correction code) added to data when retransmission control is not applied may be higher than the error correction capability of the error detection code (error correction code) added to data when retransmission control is applied.

According to still another modification example, one of the base station 41 and the mobile station 42 may transmit, to the other of the base station 41 and the mobile station 42, a control signal including information indicating whether or not to apply an error detection code related to retransmission control. This control signal may be, for example, a signal transmitted via PDCCH, a signal of MAC CE, or a signal of RRC, as in the above-described embodiments. In addition, the criterion for determining whether or not to apply an error detection code related to retransmission control may be the same as the criterion for determining whether or not to apply retransmission control. The base station 41 or the mobile station 42 that has received the control signal may control application of the error detection code related to retransmission control in accordance with the control signal. For example, when the control signal includes information indicating that an error detection code related to retransmission control is not to be added, the base station 41 or the mobile station 42 that has received the control signal does not add an error detection code related to retransmission control to data included in a transmission signal. In this case, the mobile station 42 or the base station 41 that has received the transmission signal may execute retransmission control by using an error detection code unrelated to retransmission control, for example, the CRC code added to the code block illustrated in FIG. 11A. On the other hand, when the control signal includes information indicating that an error detection code related to retransmission control is to be added, the base station 41 or the mobile station 42 that has received the control signal adds an error detection code related to retransmission control to data included in a transmission signal. Accordingly, the wireless communication system is able to dynamically switch whether or not to add an error detection code related to retransmission control to the data to be transmitted. In this wireless communication system, when an error detection code related to retransmission control is not to be added, a communication amount may be reduced by the amount of bits corresponding to the error detection code. As a result, this wireless communication system is able to increase communication efficiency.

The control signal may include information indicating whether or not to apply an error detection code related to retransmission control, together with information indicating whether or not to apply retransmission control. Alternatively, one of the base station 41 and the mobile station 42 may transmit, to the other of the base station 41 and the mobile station 42, either of a control signal including information indicating whether or not to apply an error detection code related to retransmission control and a control signal including information indicating whether or not to apply retransmission control.

The above-described embodiments or modification examples may be combined with one another. For example, the communication apparatus 11 in the first embodiment may be the base station 41 or the mobile station 42 in the second embodiment or the modification examples. Also, the communication apparatus 12 in the first embodiment may be the base station 41 or the mobile station 42 in the second embodiment or the modification examples.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communication apparatus comprising:
a radio processing circuit configured to transmit or receive a radio signal; and
a control circuit configured to control application of retransmission control in accordance with information indicating whether or not to apply the retransmission control, the information being included in a radio signal received from another communication apparatus via the radio processing circuit, wherein the control circuit controls, in accordance with the information, each of a first layer and a second layer to add or not to add an error detection code to a data block of the each of the first layer and a second layer,
wherein the adding of the error detection code is configured to
when the information indicates a configuration to apply the retransmission control, cause the control circuit to add the error detection code to a first data block in the first layer and a second data block in the second layer, the first data block being a part of the second data block, the second data block being included in a radio signal to be transmitted to the other communication apparatus, and
when the information indicates a configuration not to apply the retransmission control, cause the control circuit not to add the error detection code to the second data block in the second layer and cause the control circuit to add the error detection code to the first data block in the first layer, the first data block being a part of the second data block, the second data block being included in a radio signal to be transmitted to the other communication apparatus.

2. A wireless communication system comprising:
a first communication apparatus; and
a second communication apparatus, wherein
the first communication apparatus is configured to transmit a radio signal to the second communication apparatus, the radio signal including information indicating whether or not to apply retransmission control, and
the second communication apparatus is configured to control application of the retransmission control in accordance with the information,
wherein the second communication apparatus controls, in accordance with the information, each of a first layer and a second layer to add or not to add an error detection code to a data block of the each of the first layer and a second layer,
wherein the adding of the error detection code is configured to
when the information indicates a configuration to apply the retransmission control, cause the control circuit to add the error detection code to a first data block in the first layer and a second data block in the second layer, the first data block being a part of the second data block, the second data block being included in a radio signal to be transmitted to the other communication apparatus, and
when the information indicates a configuration not to apply the retransmission control, cause the control circuit not to add the error detection code to the second data block in the second layer and cause the control circuit to add the error detection code to the first data block in the first layer, the first data block being a part of the second data block, the second data block being included in a radio signal to be transmitted to the other communication apparatus.

3. The wireless communication system according to claim 2, wherein the first communication apparatus is configured to determine whether or not to apply the retransmission control, based on at least any of a communication state of wireless communication between the first communication apparatus and the second communication apparatus, a communication amount of the wireless communication, and a type of data transmitted between the first communication apparatus and the second communication apparatus, and to generate, based on a result of the determination, a radio signal including information indicating whether or not to apply the retransmission control.

4. The wireless communication system according to claim 2, wherein the first communication apparatus is a base station and the second communication apparatus is a mobile station.

5. A wireless communication method in a wireless communication system including a first communication apparatus and a second communication apparatus, comprising:
transmitting, with the first communication apparatus, a radio signal to the second communication apparatus, the radio signal including information indicating whether or not to apply retransmission control; and
controlling, with the second communication apparatus, application of the retransmission control in accordance with the information,
wherein the controlling of the application of retransmission control is configured to control, in accordance with the information, each of a first layer and a second layer to add or not to add an error detection code to a data block of the each of the first layer and a second layer, and
wherein the adding of the error detection code is configured to
cause the control circuit to add the error detection code to a first data block in the first layer and a second data block in the second layer according to the information indicating a configuration to apply the retransmission control, the first data block being a part of the second data block, the second data block being included in a radio signal to be transmitted to the other communication apparatus, and
cause the control circuit not to add the error detection code to the second data block in the second layer and cause the control circuit to add the error detection code to the first data block in the first layer according to the information indicating a configuration not to apply the retransmission control, the first data block being a part of the second data block, the second data block being included in a radio signal to be transmitted to the other communication apparatus.

6. A communication apparatus comprising:
a radio processing circuit configured to transmit or receive a radio signal; and
a control circuit configured to
determine whether or not to apply retransmission control, based on at least any of a communication state of wireless communication with another communication apparatus, a communication amount of the wireless communication, and a type of data transmitted between the communication apparatus and the other communication apparatus,
generate, based on a result of the determination, a radio signal including information indicating whether or not to apply the retransmission control, and
transmit the radio signal to the other communication apparatus via the radio processing circuit, wherein the generated information included in the radio signal is configured to cause the other communication apparatus to control, in accordance with the information, each of a first layer and a second layer to add or not to add an error detection code to a data block of the each of the first layer and a second layer, wherein the adding of the error detection code is configured to when the information indicates a configuration to apply the retransmission control, cause the control circuit to add the error detection code to a first data block in the first layer and a second data block in the second layer, the first data block being a part of the second data block, the second data block being included in a radio signal to be transmitted to the other communication apparatus, and when the information indicates a configuration not to apply the retransmission control, cause the control circuit not to add the error detection code to the second data block in the second layer and cause the control circuit to add the error detection code to the first data block in the first layer, the first data block being a part of the second data block, the second data block being included in a radio signal to be transmitted to the other communication apparatus.

* * * * *